Patented Feb. 3, 1925.

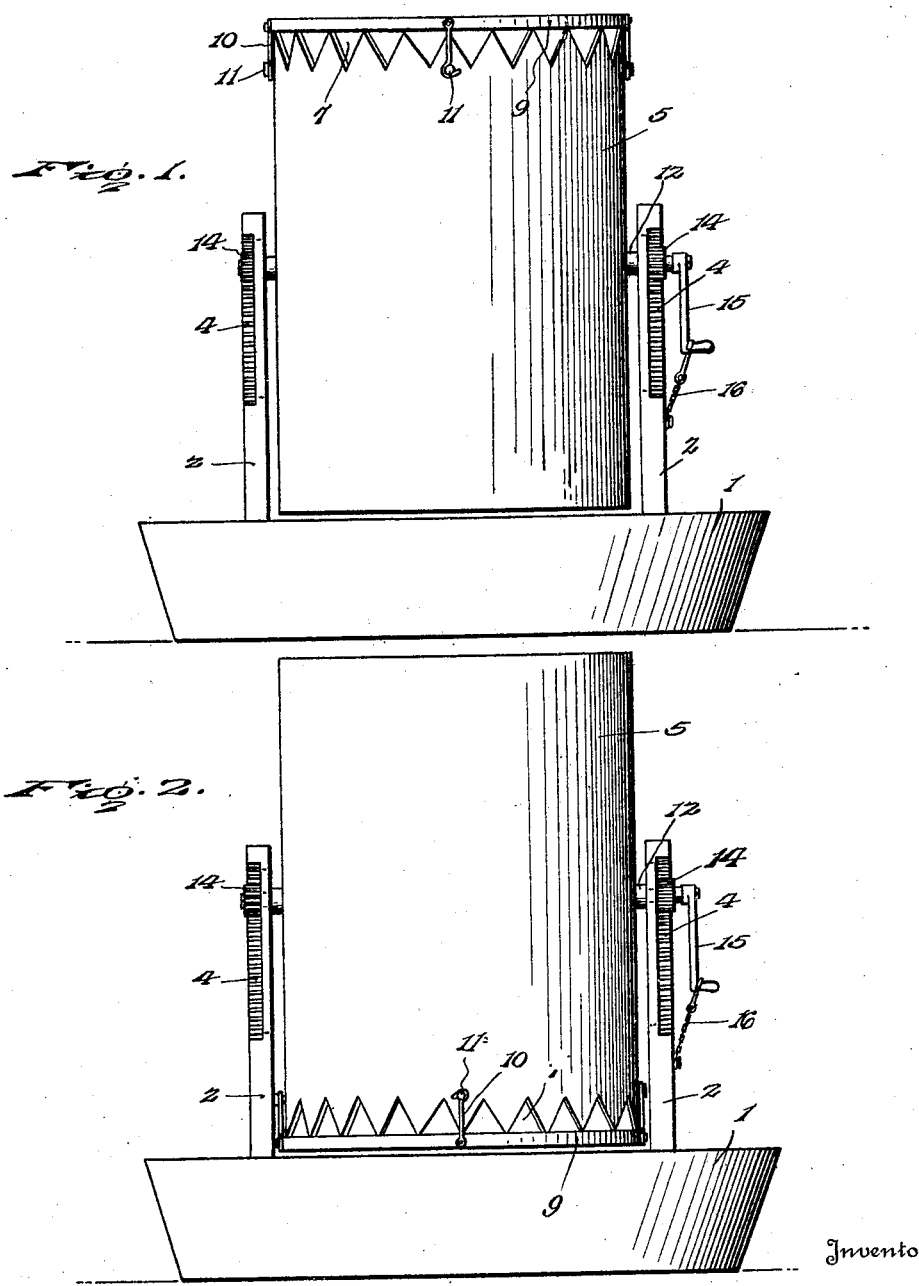

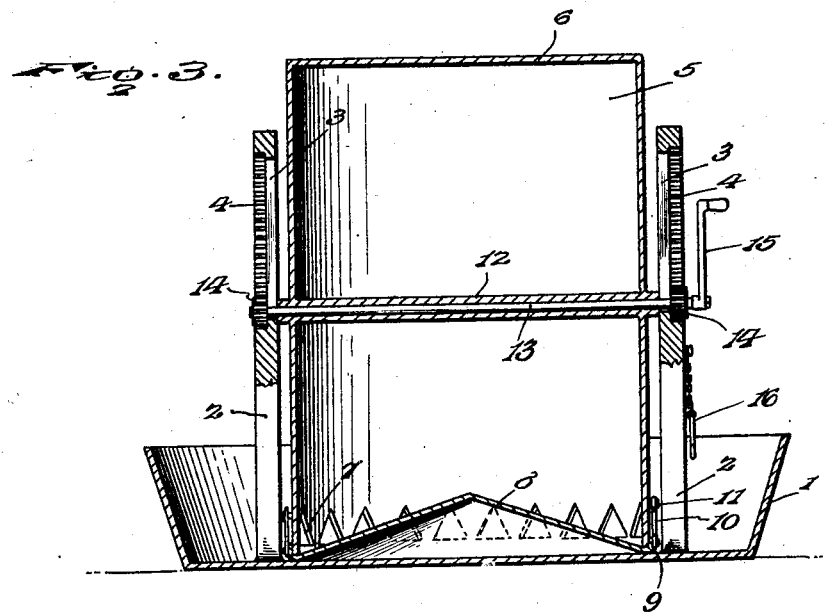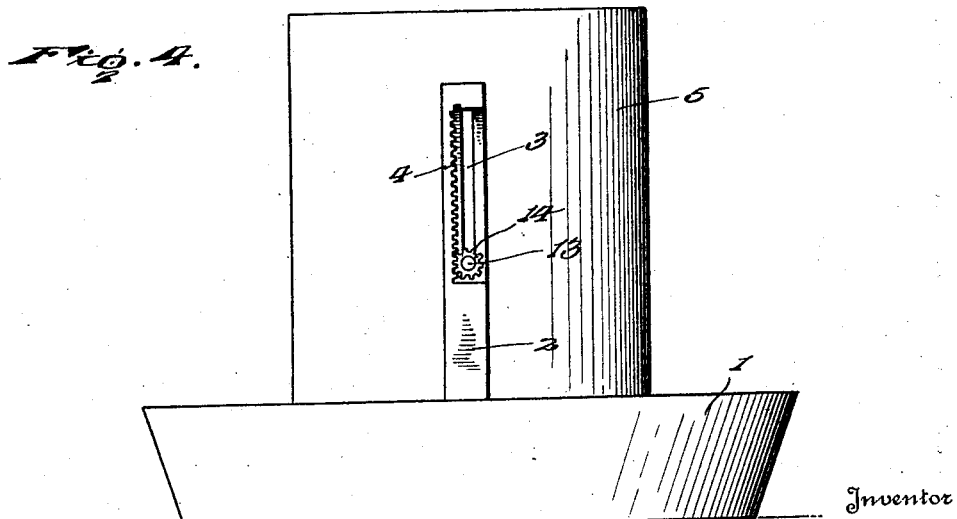

1,525,307

UNITED STATES PATENT OFFICE.

JOHN R. LINN, OF WAKONDA, SOUTH DAKOTA.

STOCK FEEDER.

Application filed February 20, 1924. Serial No. 694,063.

*To all whom it may concern:*

Be it known that I, JOHN R. LINN, a citizen of the United States, residing at Wakonda, in the county of Clay and State of South Dakota, have invented certain new and useful Improvements in Stock Feeders, of which the following is a specification.

This invention relates to devices for feeding live stock and is intended more particularly for use in providing a constant supply of wet or moist feed to small stock, such as hogs and fowls. The primary object of my invention is to provide a simple, inexpensive and easily manipulated apparatus whereby a container may be supported in position to be filled and then inverted and, when in its inverted position, permit the feed to flow automatically to a feeding trough or pan. A further object of the invention is to provide a stock-feeding device which may be easily cleaned when necessary and which is not apt to get out of order. These stated objects, and other objects which will incidentally appear in the course of the following description, are attained in such an apparatus as is illustrated in the accompanying drawings, and the invention resides in certain novel features which will be particularly pointed out in the appended claims.

In the drawings:

Figure 1 is an elevation of my improved device with the container in the filling position;

Fig. 2 is an elevation showing the container inverted and prior to being lowered to permit access of the stock to the feed;

Fig. 3 is a diametrical section through the apparatus, and

Fig. 4 is a side elevation with the container in the lowered position and viewing the apparatus at a right angle to the viewpoint in Figs. 1 and 2.

In carrying out my invention, I employ a feeding pan or trough 1 which may be of any desired dimensions or form and is preferably circular and provided with a flaring rim, as shown clearly in the drawings. Disposed upon a diameter of this pan or trough and rising from the bottom of the same are spaced standards 2 which are provided in their upper portions with longitudinal slots 3, and upon one wall of each slot is a rack bar 4. Disposed between these standards is a container 5 which is preferably cylindrical having one end, 6, closed and having its opposite end open, as shown. In the annular wall of the container at or adjacent the open end thereof, I form a series of notches or openings 7 which extend entirely around the container and constitute outlets for the feed placed therein. I also employ a cover 8 which is substantially conical and is so disposed upon the container that its apex extends into the same, the said cover being provided with a rim or flange 9 adapted to fit closely around the outer surface of the container and terminate adjacent the outlets 7. To secure the cover in place upon the container, any preferred means may be employed and I have illustrated hooks 10 mounted upon the rim 9 of the cover and adapted to engage pins or studs 11 upon the container. Extending diametrically through the container, preferably midway the ends thereof, is a tube or hollow shaft 12 having its ends projecting beyond the sides of the container, and through the said hollow shaft a rock shaft 13 is rotatably fitted. The ends of the rock shaft 13 extend through the slots 3 in the standards 2 and are equipped with pinions 14 which mesh with the respective racks 4, as shown and as will be understood. One end of the shaft 13 is equipped with a crank or other suitable handle 15 and any convenient locking means, such as a hook 16, may be mounted upon the adjacent standard 2 to be engaged with the said handle so as to prevent rotation of the same and of the shaft when the container is to be supported in its raised position.

The construction and arrangement of the several parts of the device having been thus made known, it is thought the operation and advantages of the same will be readily understood and appreciated. When the device is in use, the container is lowered, as shown in Figs. 3 and 4, and the feed will, of course, gravitate onto the cover 8 and will be deflected thereby through the several openings 7. Inasmuch as the upper end of the container is closed, a partial vacuum will be created between the same and the top of the feed and, therefore, the flow of feed through the openings 7 will be arrested when the level of the feed in the pan or trough around the container reaches the upper limits of the outlet openings 7. As the feed is consumed and is diminished so as to uncover the openings, additional feed may pass through the uncovered outlets so as to maintain a constant supply in the pan or trough but excessive flow of the feed will be automatically prevented so that waste of the same will be avoided. When the supply of feed has been exhausted and the container is to be refilled, the handle 15 is manipulated to impart rotation to the shaft 13 and the pinions 14 thereby caused to ride upwardly upon the racks 4, lifting the container from the position shown in Figs. 3 and 4 to that shown in Fig. 2. The handle 15 may then be secured against movement by engagement with the locking device 16, as shown in Figs. 1 and 2, and the container is then swung around the shaft 13 so as to bring its open end to the top, as shown in Fig. 1. The cover may then be removed and the supply of feed replenished, a performance of the described operations in reverse order returning the container to the working position shown in Figs. 3 and 4. The device is obviously simple in the construction and arrangement of its parts and may, therefore, be produced and maintained at a very low cost. The longitudinally extending slots in the supporting standards permit the shaft 13 carrying the container to be easily raised and lowered, and the side walls of the said slots constitute guides and keepers to prevent the shaft with the container thereon falling from the standards. The supply of feed in the container is not directly accessible to the feeding animals so that contamination of the same and waste thereof is positively prevented while an ample supply for proper feeding will be permitted to flow into the pan and maintain the same practically constant.

Having thus described the invention, I claim:

1. A stock-feeding device comprising a feeding trough, supports rising from the trough, a container having one open end and provided at said end with outlet openings through its wall, a removable cover for said end, and means for mounting the container upon the supports for vertical and rotary movement whereby the container may be held in an elevated position to be filled and inverted and lowered to dispose the outlet openings adjacent the bottom of the feeding pan.

2. A stock-feeding device comprising a pan having an upwardly extending rim, supports rising from the bottom of the pan, and a container having one closed end and one open end mounted upon the supports for vertical and rotary movement whereby the open end of the container may be disposed uppermost to permit filling of the container and the container inverted and lowered to bring said end to the bottom of the pan, the container being provided around its open end with passages for the flow of feed into the pan.

3. A stock-feeding device comprising a feeding pan, a pair of spaced standards rising from the pan, a container disposed between said standards and having one closed end and one open end, a conical cover fittting over the open end of the container with its apex extending into the container, the container being provided with outlet openings around said end, and means for mounting the container upon the standards for rotatable movement whereby it may be inverted.

4. A stock-feeding device comprising a feeding pan, spaced standards rising from the pan and provided in their upper portions with longitudinal slots, rack bars extending longitudinally of the slots, a container disposed between the standards and provided between its ends with a hollow shaft, a supporting shaft extending through said hollow shaft and having its ends disposed within the slots in the supporting standards pinions on said shaft meshing with the racks on the standards, means for rotating said shaft, and means for locking the shaft against rotation.

In testimony whereof I affix my signature.

JOHN R. LINN. [L. S.]